(12) United States Patent
Lorenzo et al.

(10) Patent No.: US 8,588,361 B2
(45) Date of Patent: Nov. 19, 2013

(54) DEVICE FOR SUPPORTING NUCLEAR FUEL PLATE FOR A FISSILE BUNDLE OF A NUCLEAR REACTOR OF GFR TYPE WITH HIGH-TEMPERATURE HEAT TRANSFER GAS

(75) Inventors: Denis Lorenzo, Manosque (FR); Alain Ravenet, Vinon-sur-Verdon (FR); Romain Garrigue, La Cadiere d'Azur (FR); Guy Mailhe, Pierrevert (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 602 days.

(21) Appl. No.: 12/738,898

(22) PCT Filed: Oct. 24, 2008

(86) PCT No.: PCT/EP2008/064421
§ 371 (c)(1),
(2), (4) Date: Apr. 20, 2010

(87) PCT Pub. No.: WO2009/053453
PCT Pub. Date: Apr. 30, 2009

(65) Prior Publication Data
US 2010/0208862 A1 Aug. 19, 2010

(30) Foreign Application Priority Data
Oct. 26, 2007 (FR) ..................... 07 58625

(51) Int. Cl.
*G21D 5/08* (2006.01)
(52) U.S. Cl.
USPC ............. 376/433; 376/432; 376/429

(58) Field of Classification Search
USPC ............ 376/432, 440, 428, 903
See application file for complete search history.

(56) References Cited

U.S. PATENT DOCUMENTS

| 3,240,680 | A | * | 3/1966 | Laithwaite et al. | 376/432 |
| 3,322,645 | A | * | 5/1967 | Barker et al. | 376/432 |
| 4,134,791 | A | * | 1/1979 | Delafosse | 376/432 |

(Continued)

FOREIGN PATENT DOCUMENTS

| DE | 2 204 168 A | 8/1973 |
| DE | 2204168 A * | 8/1973 |

(Continued)

OTHER PUBLICATIONS

French Preliminary Search Report dated Apr. 7, 2008.

(Continued)

*Primary Examiner* — Jack W Keith
*Assistant Examiner* — Sean P Burke
(74) *Attorney, Agent, or Firm* — Pearne & Gordon LLP

(57) ABSTRACT

A device for supporting nuclear fuel plates (4) with a longitudinal axis (X) including a bottom (6) forming a lower longitudinal end of the supporting device and a lid (8) forming an upper longitudinal end of the supporting device, the bottom (6) and the lid (8) being rigidly connected to each other through a central connecting means and peripheral connecting means, a plurality of upper means (18) for supporting the plates (4) attached to the lid (8), and a plurality of lower means (16) for supporting the plates (4) attached to the bottom (6), ensuring elastic support of the longitudinal ends of the plates (4) in a direction of the width (R) of the plate (4) and allowing free deformation of said longitudinal ends in the direction of the thickness (T) of the plate.

14 Claims, 9 Drawing Sheets

(56) References Cited

U.S. PATENT DOCUMENTS

Figure 1:
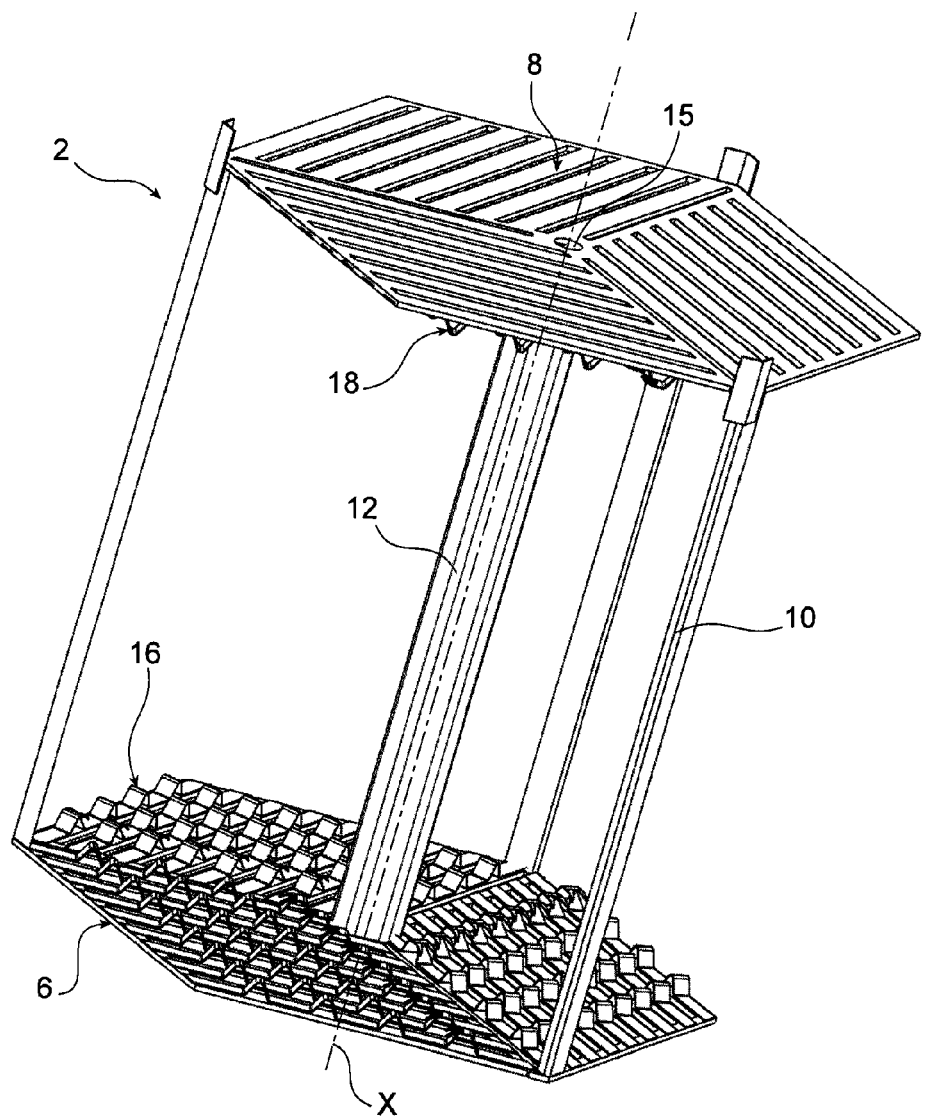

| | | | | |
|---|---|---|---|---|
| 4,311,559 A | * | 1/1982 | Knowles | 376/432 |
| 5,289,514 A | * | 2/1994 | Lippert et al. | 376/440 |
| 2009/0274262 A1 | * | 11/2009 | Ravenet | 376/432 |

FOREIGN PATENT DOCUMENTS

| FR | 2 326 765 A1 | | 4/1977 |
| --- | --- | --- | --- |
| FR | 2326765 A1 | * | 4/1977 |
| FR | 2 354 610 A1 | | 1/1978 |
| FR | 2354610 A1 | * | 1/1978 |
| FR | 2 889 765 A | | 2/2007 |
| FR | 2889765 A | * | 2/2007 |
| GB | 872 719 A | | 7/1961 |
| GB | 0872719 A | * | 7/1961 |
| GB | 907 393 A | | 10/1962 |
| GB | 0907393 A | * | 10/1962 |
| GB | 1 162 641 A | | 8/1969 |
| GB | 1162641 A | * | 8/1969 |
| GB | 1 403 491 A | | 8/1975 |
| GB | 1403491 A | * | 8/1975 |
| GB | 1 519 546 A | | 8/1978 |
| GB | 1519546 A | * | 8/1978 |
| GB | 2 021 844 A | | 12/1979 |
| GB | 2021844 A | * | 12/1979 |

OTHER PUBLICATIONS

International Search Report for PCT/EP2008/064421 dated Apr. 23, 2009.

* cited by examiner

DEVICE FOR SUPPORTING NUCLEAR FUEL PLATE FOR A FISSILE BUNDLE OF A NUCLEAR REACTOR OF GFR TYPE WITH HIGH-TEMPERATURE HEAT TRANSFER GAS

TECHNICAL FIELD AND PRIOR ART

The present invention relates to a device for supporting plate-shaped elements of nuclear fuel for a fast-flux nuclear reactor, more particularly a fourth generation fast-flux reactor with a high temperature heat transfer gas, called a GFR (Gas Fast Reactor) reactor, with a fissile bundle formed by a plurality of said supporting devices loaded with nuclear fuel plates and a monolithic assembly including such a fissile bundle.

Generally, plants for producing power from nuclear fission reactions use fuel elements in which fissions occur releasing heat power, which is extracted therefrom by heat exchange with a heat transfer fluid ensuring their cooling.

In the case of plates of fuels, the latter are combined in a group and positioned parallel to each other within each group. The heat transfer fluid, for example helium, flows between the plates ensuring extraction of the calories by heat exchanges.

The core of the reactors is formed by structures which have several functions.

From a thermo-hydraulic point of view, with the structures, it is possible to guarantee heat transfer between the fuel elements and the heat transfer fluid in all the operating situations, i.e. they guarantee the positioning of the fuel elements and the thicknesses of the heat transfer fluid layers required for their cooling, as well the supply of the hydraulic channels with heat transfer fluid. For this, the structure should sufficiently support the fuel elements so that the thicknesses of heat transfer fluid layers flowing between the plates vary very little, and further that the relative positioning of the plates is such that circulation of the fluid is allowed in a homogenous way on the faces of the plates.

Moreover, it is desired that these structures introduce a minimum of pressure losses in the assembly, notably in order to allow evacuation of the residual power in a natural convection mode during certain accidental situations.

By <<volume fraction of a component>> is meant the ratio between the volume of the component over the volume of the core.

From a neutron point of view, it is sought to guarantee the stability of the geometry in the space of the fuel elements, to ensure a given density of the filling of fissile fuel so as to be able to reach a bulk power required for proper operation and for good yield of the reactor and such that the structures are the most <<transparent>> as possible to neutrons in order not to perturb the neutron operation of the core, and this regardless of the operating mode of the reactor, either in rated operation or when operating in an accidental situation. For this, it is sought to reduce as much as possible the volume fraction of the structures of the core as well as their neutron absorption and moderation coefficient.

From a mechanical point of view, the structures are intended to ensure the mechanical architecture of the core. Moreover, it is required that these structures ensure the integrity of the fuel elements during the whole of their lifetime, in order to guarantee proper neutron operation of the core and not to contaminate the primary circuit.

Moreover, generally, when operating the reactors, the fuel elements which are heating elements, are at a higher temperature than their supporting structures, which leads to positive differential heat expansion of the fuel elements relatively to their supporting structure.

In the particular case of fast reactors in which the core is not moderated, for which reference is made to a fast spectrum (a heat spectrum in the case when the core is moderated), there exists a larger risk of degradation of the fuel elements than in a heat spectrum since the fast spectrum introduces differential swelling phenomena in addition to differential expansions. By swelling is meant a definite deformation of the materials, unlike heat expansion for which deformation is reversible.

Therefore, locally, risks of interaction stresses between the fuel elements and their supporting structure are higher; and at the level of the entire core, bowing of the assemblies over a core height may be significant, while it was not significant in a heat spectrum.

This may then have two consequences:
  a risk of mechanical loading of the fuel elements by the supporting structures,
  a risk of mechanical loading between the elements ensuring the mechanical architecture of the core, which may be transferred to the fuel elements.

Additionally, the fast spectrum causes embrittlement of the materials under irradiation notably because of:
  the increase in the ductile/brittle transition temperature,
  the occurrence of brittle phases and excessive swelling of the materials.

This embrittlement makes accommodation more difficult of the loads of the imposed deformation type, whether they are expressed as internal stresses within the materials or as interaction stresses between the parts.

Moreover, it is desirable that these structures facilitate the operations of all the steps of the fuel cycle, notably handling operations in general, assembling, disassembling, transport and reprocessing operations.

Finally, as all the constituents of the reactor core are dangerous for the environment, the latter should undergo reprocessing steps. It is therefore desirable to promote demountability of the structures of the core in order to optimize their lifetime and thereby minimize the amount of activated waste.

Further, a high bulk fuel fraction should be attained, at least of the order of 20% in order to obtain a fast spectrum, isogeneration, or even overgeneration, an interesting yield, controllable reactivity in order to guarantee sufficient safety margins for controlling the reactor and finally an acceptable inventory of fissile material.

Moreover, in order to meet the goals set for fourth generation reactors, it appears that with the cores of reactors of the GFR type, in addition to the fact that they should have a fast flux ensuring the possibility of obtaining a conversion rate at least equal to 1, in order to considerably reduce the amount of uranium required per energy unit produced and/or a capacity of transmutating the waste products (fission products and minor actinides), it should also be possible with a heat transfer gas, to reach at the outlet of the reactor a sufficiently high average temperature value compatible with contemplated applications for producing electricity with a high yield (for example in a direct cycle), for producing hydrogen, for desalting sea water or for synthesizing fuel; this value is set to about 900° C. for an inlet temperature of the order of 400° C., which gives rise to an axial heat gradient in the core of 500° C. These goals of using a heat transfer gas, at a temperature at the outlet of the core and with a very large heat gradient in the core for a GFR type reactor, among all the reactor systems, lead to very strict operating conditions as regards local differential thermal expansions, which lead to a risk of degradation of the fuel elements.

Indeed, the heat transfer gas is not very efficient for ensuring local cooling of a hot point by conductive exchange, both because of the low heat conductivity of the gas, as compared with water of pressurized water reactors or with sodium of fast neutron reactors, and because of the very high rate which has to be applied to it accordingly in order to ensure the cooling of the fuel elements; about a hundred m/s are required for the gas, against only about 10 m/s in fast neutron reactors and about 5 m/s in pressurized water reactors for example.

Further, the core globally has very large heat gradients: the average axial rise in temperature is actually predicted along the plates to be of the order of 500° C., against about 180° C. at most, for a fast neutron reactor, and only 37° C. for a pressurized water reactor.

Moreover, swelling under irradiation is generally dependent on temperature. Therefore, the existence of strong local heat gradients risks a further increase in the significance of these differential swellings.

Differential deformations are all the more bothersome in the case of GFR type reactors, since the latter apply refractory materials adapted to the high temperatures of these reactors, these materials intrinsically having lower toughness and reserve of ductility than the metal materials conventionally used in reactors, they are therefore particularly sensitive to these deformations.

There exist several types of reactors using fuel elements of the plate type, for example experimental reactors of the MTR (Material Testing Reactor) type, such as for example the Jules Horowitz Reactor (JHR). In this reactor, the plates are supported over the whole of their height by slider connections, the plates occupying the whole of the height of the core. This type of design cannot be suitable for GFR type reactors because the occurrence of differential expansion and of differential swelling would cause application of unacceptable stresses on the plates.

A supporting structure for fuel elements of the plate type for a reactor cooled by a heat transfer gas is also known from document GB 2,021,844 A. This supporting structure consists of a hexagonal box in which is attached a central separation element in the form of a spider, which extends over the whole height of the box. The plates are held transversely in grooves made in the spiders and in the internal faces of the hexagonal box. The plates do not occupy the whole height of the core, but are stacked on each other, the lower plate lying on an abutment made at the base of each groove. The supporting structure of the plates is particularly rigid, since it consists of a totally partitioned thick box and with great inertia, and providing rigidity over the whole of its height by the central spider.

This type of structure cannot always be suitable in the case of a GFR type reactor, since it does not consider the swelling and expansion of the constituents of the structure. Indeed, a deformation of the fuel plates would be impeded by the rails, which would apply a stress which may be damageable to the plates. Further because of the stacking of the plates over the whole height of the core, immobilization of a plate in its rails because of swelling, would then block the axial deformations of the other plates: under these conditions a loading of the deformation type imposed to the fuel elements would be obtained, which would lead rapidly to their ruin.

Moreover, handling of this structure is not easy, indeed, it does not allow separation of the plates per modules, only individual handling of the plates is possible.

Document GB 1,162,641 also describes an assembly of fuel elements of the plate type. The assembly consists of a hexagonal casing provided with three central partitions forming a spider, wherein the plates are directly integrated. The plates occupy the whole height of the fissile bundle, they are welded at the bottom of the bundle and their spacing at the top of the bundle is ensured by a comb system allowing them to freely expand axially. The side edges of the plates are in contact with the inner walls of the casing over the whole of their length. The side contact with the casing and its internal partitions does not allow differential transverse deformation between the casing and the plates, and the welding of the plates at their lower end does not allow them to bow. These transverse contact conditions of the plates over the whole height of the casing would moreover lead to loading of the plates in the case of bowing of the casing.

Document GB 907,393 describes a system for holding fuel plates for a fast-flux reactor. The plates are positioned in a box with a rectangular section and occupy the whole height of the box. The latter are maintained at an upper zone and at a lower zone by lateral racks with mechanical functional play which should allow them to freely bow under the effect of the swelling of the fuel. The fuel plates are interdependent on each other, a deformation of one of the plates therefore has consequences on the neighboring plates. Moreover, the supporting system is rigid, the plates may therefore also undergo stresses during their swelling and/or expansion.

Accordingly an object of the present invention is to provide an assembly of nuclear fuel for a fast reactor, wherein the nuclear fuel plates may deform, as well as the other elements forming the assembly without being deteriorated by interaction between the plates and the different elements, while observing a very high bulk fraction of fuel material in the core, advantageously of at least 20%.

DISCUSSION OF THE INVENTION

The goals stated earlier are achieved by an assembly including a casing surrounding a structure forming a cage, in which plates are distributed storeywise, the plates are positioned parallel to each other per group and are only held by their lower and upper ends in the direction of their width. Thus, the plates parallel to each other are mechanically independent and have no influence on each other. Moreover, by means of the invention, there is no mechanical interaction between the plates of two distinct storeys. Moreover, the cage and the casing are dissociated, as well as the deformations of the casing/the cage respectively do not have any influence on the cage/casing respectively. Further, the cage is such that the plates also do not come into contact with the casing. Thus, deformations by expansion and/or swelling of each part of the assembly may occur freely, without any significant interaction stresses.

In other words, the present invention ensures mechanical decoupling between the fuel elements and the supporting structures, but also decoupling between the axial fuel elements. Further, it ensures decoupling between the supporting structures and the structure of the core.

The invention then applies connections of the isostatic type between each fuel element and its supporting structure in order to avoid the occurrence of interaction stresses which may lead to the ruin of the fuel elements. By a connection of the isotatic type, is meant the absence of overabundance of the connections between the structures and the fuel elements, and the presence of mechanical functional plays, and/or supporting elastic stiffnesses for the existing connections, in order to allow free deformation of the fuel elements in their supporting structure.

According to the invention, it is therefore notably provided that the assembly includes several storeys of mechanically independent plates.

Provision is notably be made for making a relatively flexible supporting structure capable of avoiding that the supporting structures apply significant stresses to the fuel plates in the case of larger differential deformations than predicted. Further, the structure achieves axial support of the plates, which is less cumbersome than a transverse support. This reduction of the required space allows limitation of the reduction of the fuel volume fraction in the core and too significant hydraulic dead volumes may be avoided.

With the invention, it is therefore possible to avoid mechanical interaction between the faces of the fuel plates, to dissociate and mechanically decouple the structures ensuring support of the fuel elements from those ensuring the mechanical architecture of the core, and attain a high volume fraction.

The subject-matter of the present invention is then mainly a device for supporting nuclear fuel plates with a longitudinal axis including a bottom forming a lower longitudinal end of the supporting device and a lid forming an upper longitudinal end of the supporting device, the bottom and the lid being connected to each other through a central connecting means and peripheral connecting means, a plurality of upper supporting means for the plates attached to the lid, a plurality of lower supporting means for the plates attached to the bottom, each upper supporting means ensuring elastic support of an upper longitudinal end of a plate in a direction of the width of the plate and allowing free deformation of the upper longitudinal end of the plate in a direction of the thickness of the plate, and each lower supporting means ensuring elastic support of a lower longitudinal end of a plate in a direction of the width of the plate and allowing a movement of the lower longitudinal end of the plate in the direction of the thickness of the plate.

In a particularly advantageous embodiment, each upper supporting means includes an upper comb provided with a plurality of aligned teeth, protruding longitudinally toward the bottom, one of said teeth being capable of exerting an elastic force along the direction of the width of the plate and each lower supporting means includes a lower comb provided with a plurality of aligned teeth, protruding longitudinally towards the lid, one of said teeth being capable of exerting an elastic force along the direction of the width of the plate. These supporting means are of a very simple and not very bulky design, therefore the cost price is reduced, also the bulkiness. Moreover, these supporting means participate in reducing the volume fraction of the supporting device.

The teeth providing the elastic support provide support and a positioning reference along the width of the tooth, and the other teeth ensure transverse support while ensuring freedom of transverse deformation, i.e. a capability of accommodating the transverse bowing of the plate as well as differential deformations with the plate.

Advantageously, the teeth capable of exerting an elastic force along the direction of the width of the plate are positioned at an axial end of the lower and upper combs positioned towards a central portion of the bottom and of the lid respectively, which guarantees observance of the width of the gas layer flowing between an end of the first plate and the face of a second plate tilted relatively to the first plate.

For example, the teeth capable of exerting an elastic force along the direction of the width of the plate include at least one elastically deformable curved tab in a single piece with the tooth. This design has the advantage of being simple and robust.

The supporting device may have a cross-section having the shape of a regular hexagon, the upper and lower supporting means being distributed in three rhombus-shaped areas, a rhombus of the bottom facing a rhombus of the lid. With this shape, it is possible to ensure the mechanical architecture function of a fast-flux reactor having hexagonal casings.

The lower combs of a same area may then be positioned parallel to both sides of the rhombus and are separated by said given distance, and all the upper combs of a same area are positioned parallel to two sides and are separated by said given distance.

The supporting device may include three longitudinal tie rods attached on the periphery of the bottom and of the lid, connecting the bottom and the lid. These tie rods keep the bottom and the lid substantially parallel and avoid the occurrence of a too large misalignment between the bottom and the lid while participating in a structure of small volume and of reduced mass.

The supporting device may also include a central beam interposed between the bottom and the lid, said beam including a longitudinal through-passage, this beam forming a support for the upper supporting devices. This beam advantageously has a hexagonal shape, ensuring constant distance between this central beam and the edges of plates in order to limit the aeraulic dead spaces and guarantees geometrical tolerance of the angular positioning of the lid relatively to the base.

The supporting device according to the invention also includes advantageously means for orienting an upper supporting device, a bottom of which is intended to rest on the lid so as to align the plates positioned in the supporting device with those positioned in the upper supporting device, the relative orientation allowing alignment of the plates over the whole height of the stack and improved gas flow may be obtained between the plates by means of continuous inter-plate channels for circulation of the gas and with a substantially constant section.

These orientation means may include small plates attached on a periphery of the lid and protruding longitudinally away from the bottom, so as to delimit a perimeter with a hexagonal shape. They are of very simple design and also form preferential contact means with the casing of the assembly.

The small plates are for example attached on the longitudinal tie rods.

The supporting devices form a preferential handling means for fuel plates for all the steps of the fuel cycle (mounting, handling, transport, storage, reprocessing) and allow minimization of the amount of activated waste.

The subject-matter of the present invention is also a fissile bundle including at least one first and one second supporting device according to the present invention, and plates of nuclear fuels loaded in said first and second supporting devices, the second supporting device being stacked on the first supporting device, the bottom of the second supporting device resting on the lid of the first supporting device.

The plates then advantageously include axial cavities at their longitudinal ends with a shape corresponding to that of the teeth. By segmentation of the fissile bundle, it is possible to accommodate the bowing of the casing by relative flexure of the supporting devices relatively to each other.

The fissile bundle according to the invention advantageously includes a base on which rests the bottom of the first supporting device, and a central tie rod attached in a central area of the base and longitudinally passing through the central beams and an upper abutment attached to the central tie rod. Thus, the fissile bundle may be handled easily. Further, with the central tie rod, it is possible to avoid delocalization of the baskets by means of the upper abutment attached at the top of the tie rod.

The fissile bundle advantageously includes means for orienting a lower supporting device, the bottom of which rests on the base, these orientation means including small plates attached on a periphery of the base and protruding longitudinally towards the bottom so as to delimit a perimeter of hexagonal shape. The dimensioning of these small plates also determines the capability of flexure of the lower supporting device relatively to the base.

The plates advantageously include axial cavities at their longitudinal ends with a shape matching that of the teeth, the depth of the cavities being larger than the longitudinal dimension of the teeth and the cavity width being larger than that of the teeth.

The plates may for example include a first panel, a grid of a plurality of walls interdependently attached to the first panel in order to form separate cells, and at least one nuclear fuel pellet extending along an axis between two opposite faces, in which the pellet is localized in a cell with radial play between its wall and the pellet, the axis of the pellet being substantially parallel to the walls of the cell.

The plates may include a second planar panel interdependently attached to the grid, parallel and opposite to the first panel, in order to close the cells, or a second panel comprising a protruding grid which is complementary to the grid of the first panel and interdependently attached to the grid of the first plate in order to close the cells.

The grid advantageously is a honeycomb structure with hexagonal cells.

The subject-matter of the present invention is also a nuclear fuel core assembly for a high temperature fast nuclear reactor with a heat transfer gas notably including a fissile bundle according to the present invention and a casing with a longitudinal axis and a hexagonal section mounted around the fissile bundle.

Play is provided between the casing and the fissile bundle, this play being smaller at the small plates attached at the periphery of the supporting devices and at small plates attached at the periphery of the base, with which mechanical interactions between the plates and the casing may be avoided in the case of deformation of the plates and/or of the casing.

Further, for IVth generation fast reactors, provision is made for introducing minor actinides produced by the present pool of reactors into the fuel in order to optimize their recycling. By means of the invention, as the units of fuel elements may be handled easily, handling of fuel elements may then be carried out under shielded cell conditions for all the steps of the fuel cycle (mounting and dismantling of the assemblies, transport, reprocessing).

SHORT DESCRIPTION OF THE DRAWINGS

Figure 2:
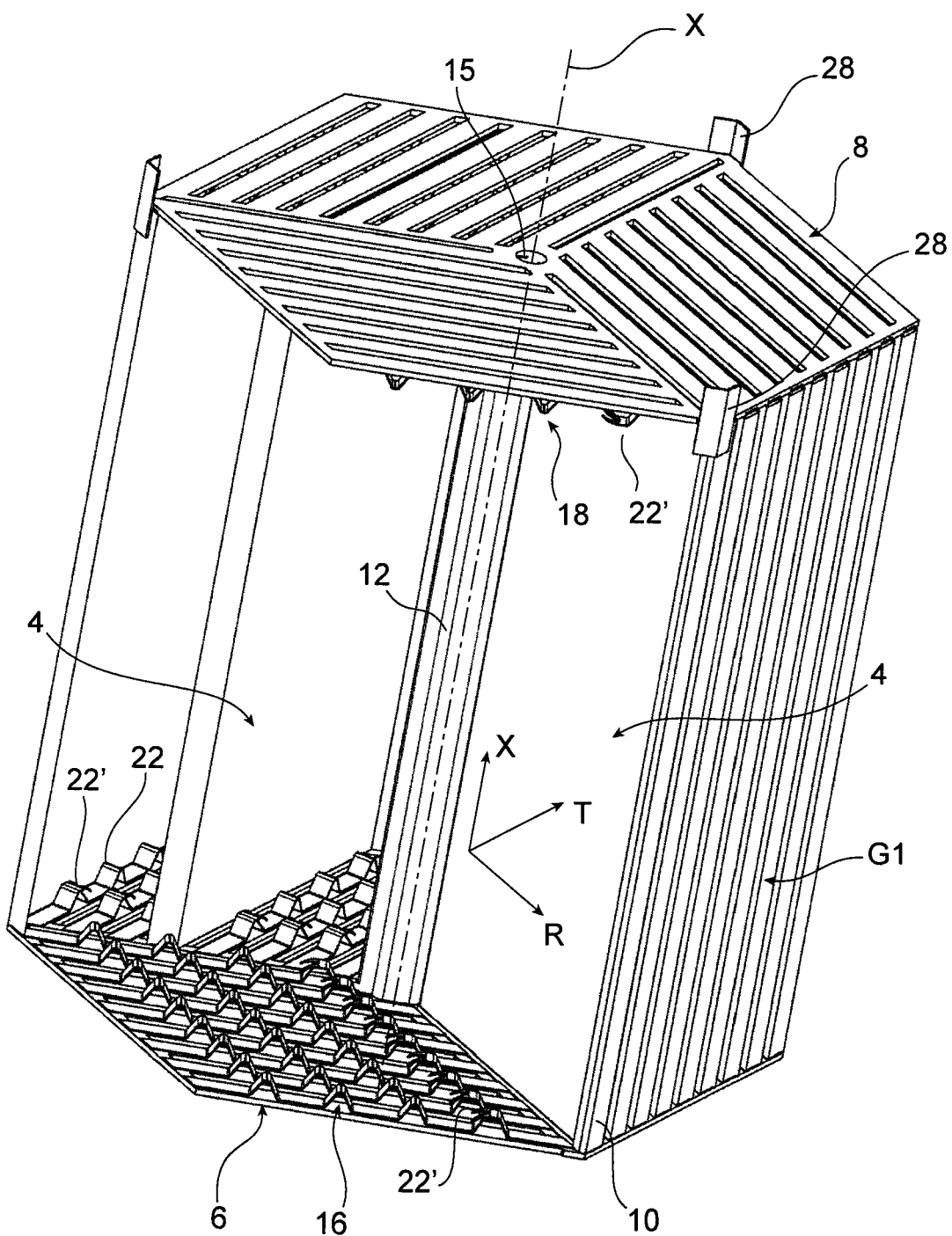
Figure 3:
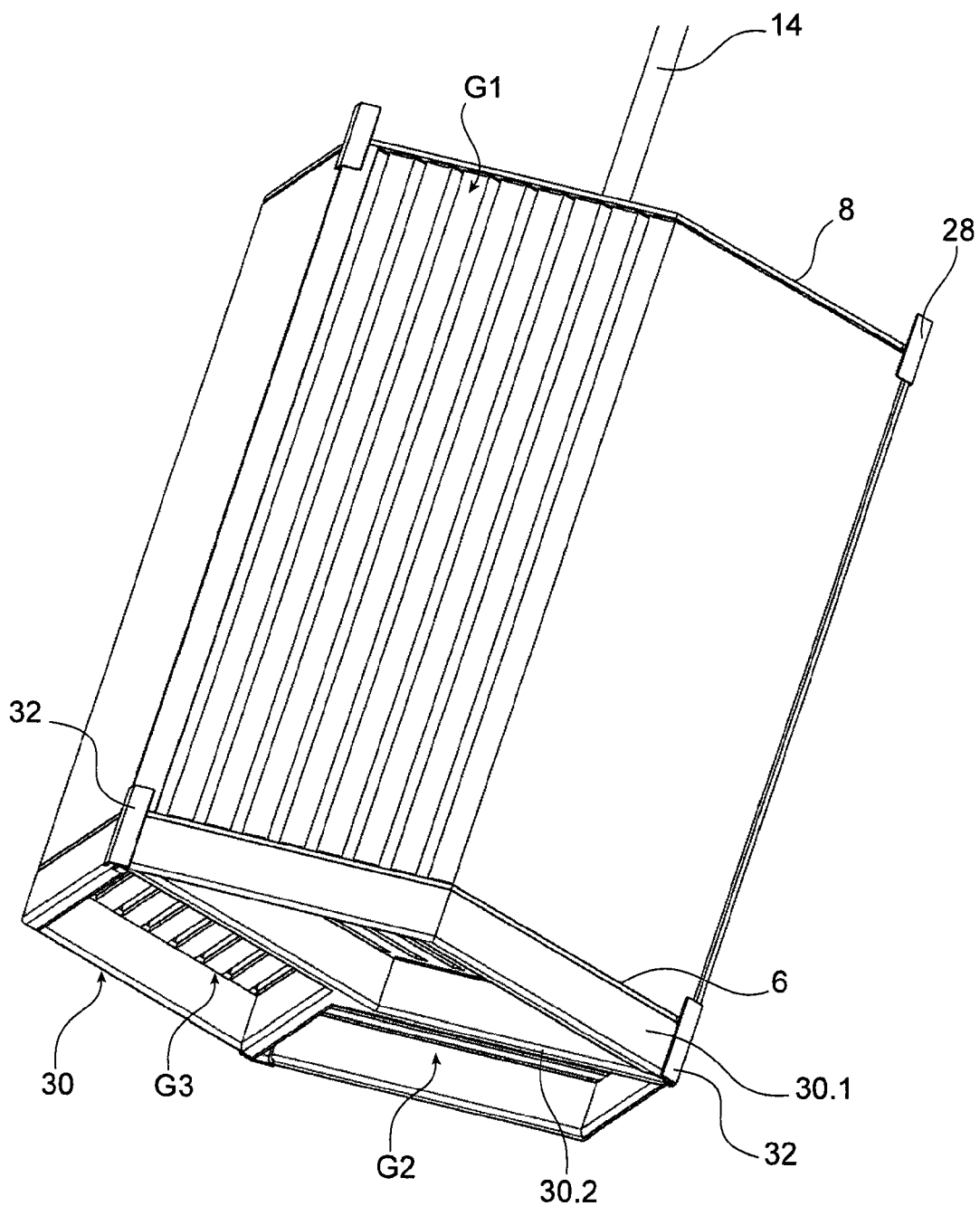
Figure 4A:
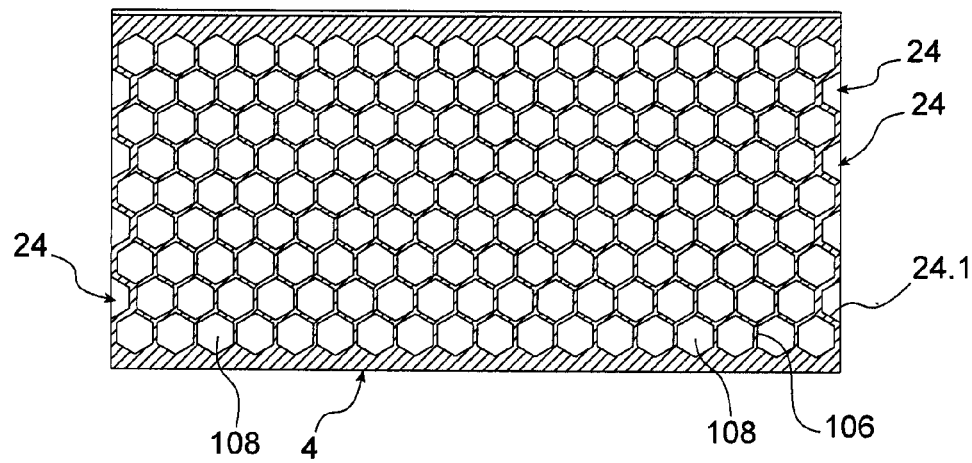
Figure 4B:
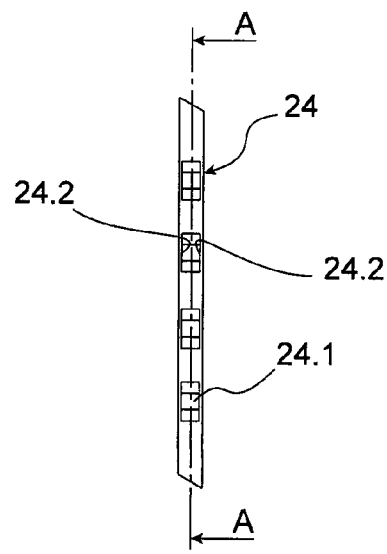
Figure 4C:
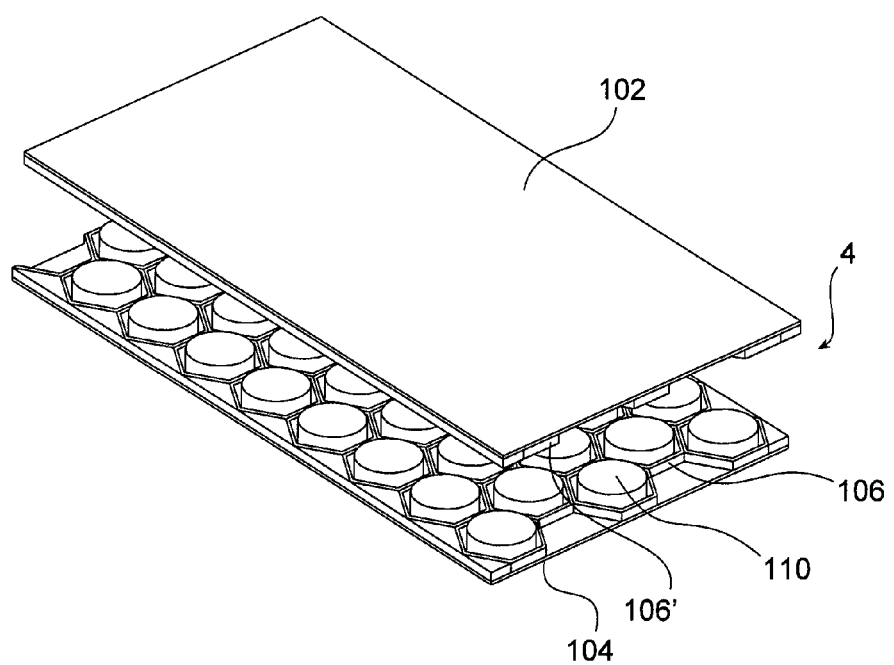
Figure 5:
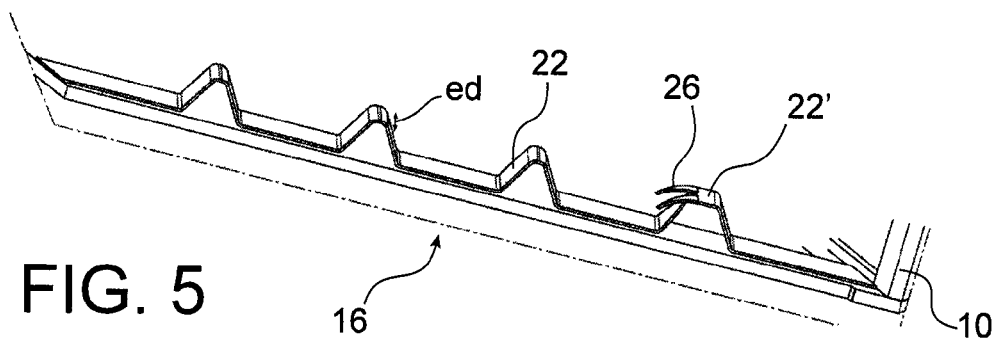
Figure 6:
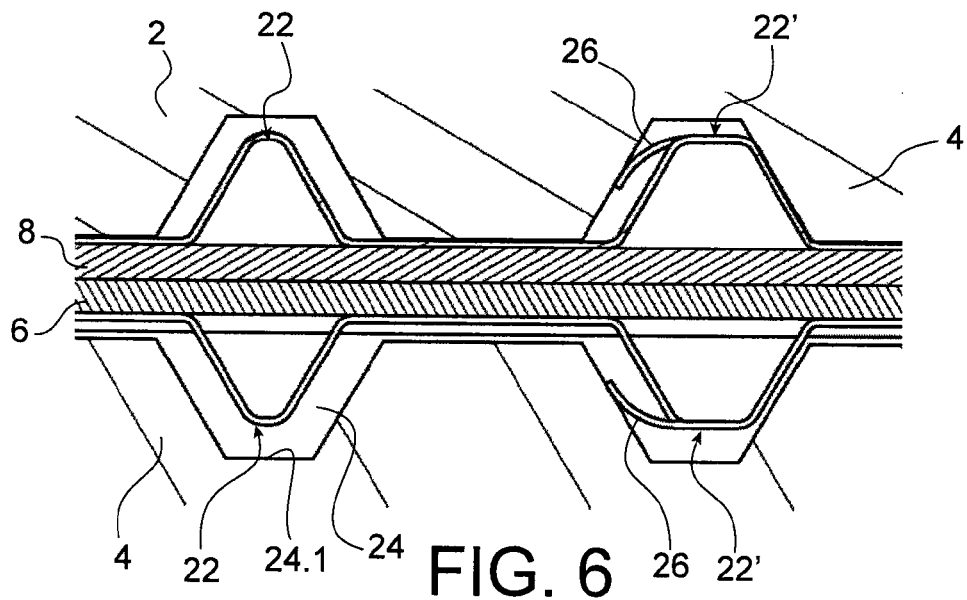
Figure 7:
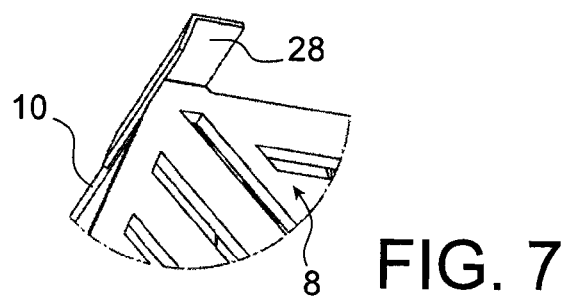
Figure 8:
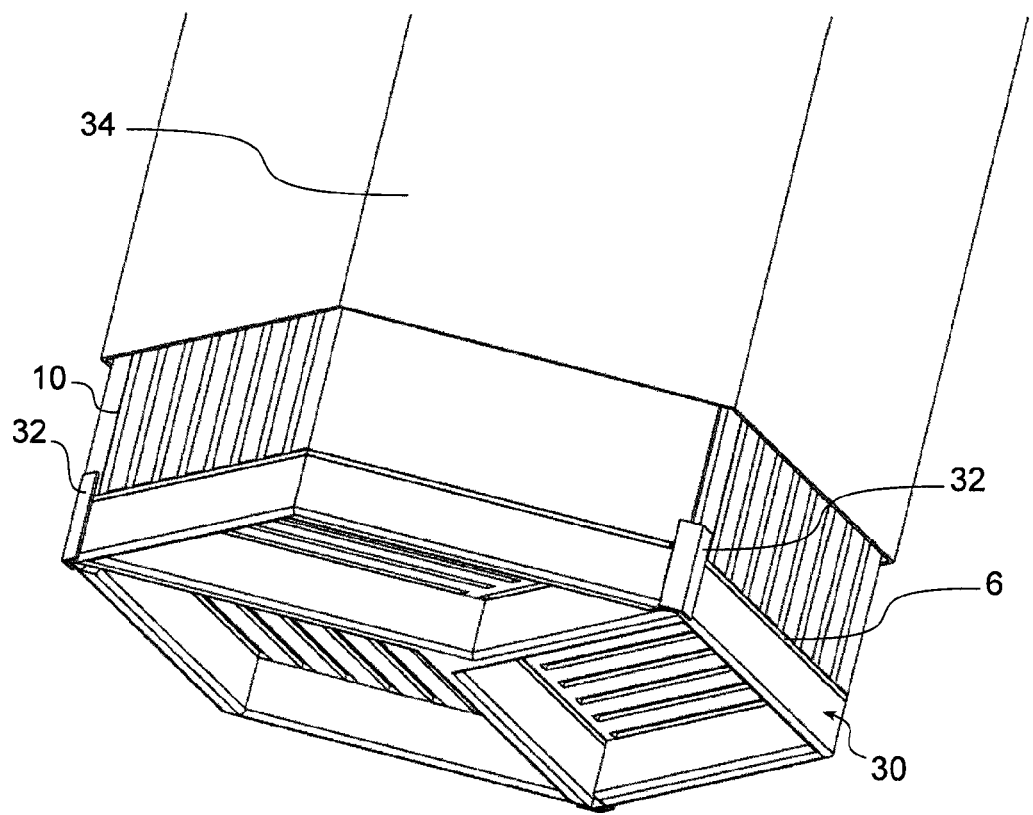
Figure 9A:
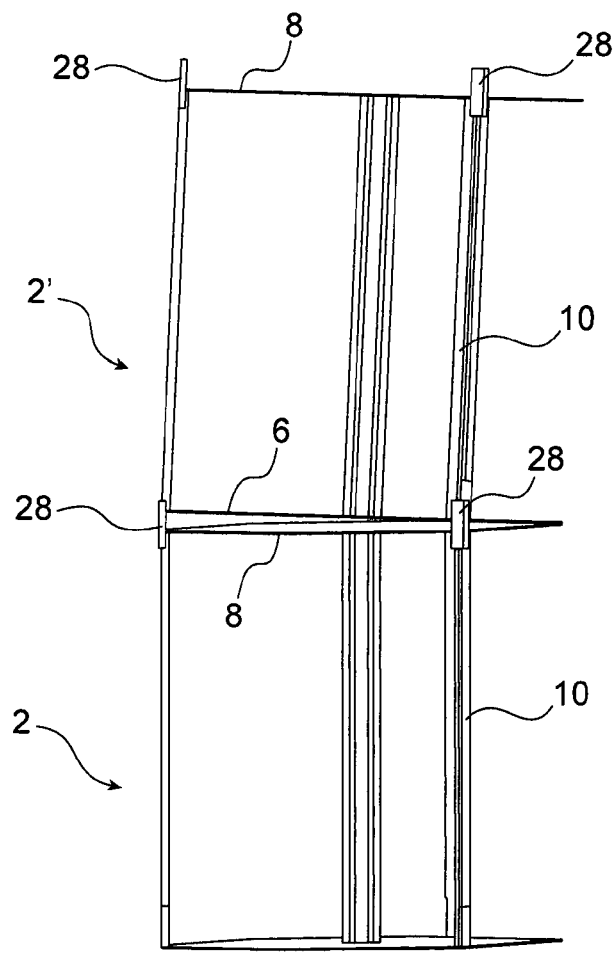
Figure 9B:
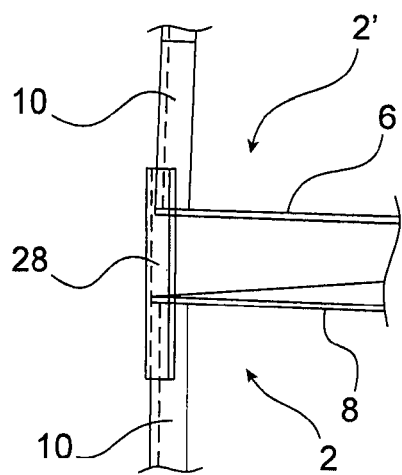
Figure 10:
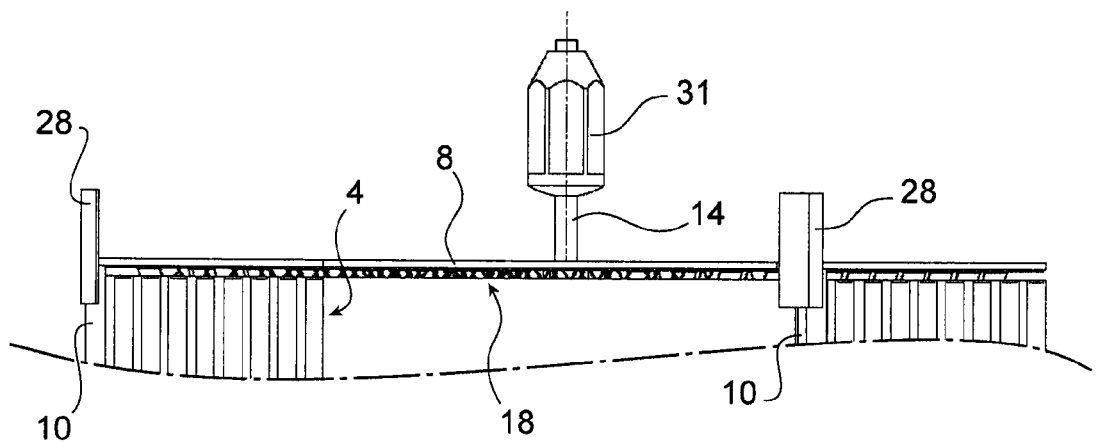

The present invention will be better understood with the description which follows and with the appended drawings wherein:

FIG. 1 is a three-quarter view of a device for supporting fuel plates according to the present invention, FIG. 2 is a three-quarter view of the supporting device of FIG. 1 partly filled with plates, FIG. 3 is a three-quarter view of the supporting device of FIG. 1 completely filled with plates, and positioned on the base of the fissile bundle, FIG. 4A is a longitudinal sectional view of a fuel plate particularly adapted to the supporting device of the present invention, FIG. 4B is an external view of a longitudinal end of the plate of FIG. 4A, FIG. 4C is an exploded perspective view of the concept of the fuel plate of FIG. 4A, FIG. 5 is a detailed view of the supporting device at an interface with a lower end of the plate, FIG. 6 is a longitudinal sectional view of a lower end of a plate and of an upper end of another plate mounted in a supporting device according to the invention, FIG. 7 is a detailed view of a side end of a supporting device according to the invention, FIG. 8 is a view of an assembly according to the invention, the casing being partly shifted axially, FIGS. 9A and 9B are schematic illustrations of simulated flexure between two devices for supporting a fissile bundle according to the present invention, FIG. 10 is a detailed view of the upper portion of a fissile bundle according to the invention.

DETAILED DISCUSSION OF PARTICULAR EMBODIMENTS

In FIG. 1, a three-quarter perspective view may be seen of a device for supporting nuclear fuel plates according to the present invention intended to be part of a monolithic assembly forming the core of a fast-flux nuclear reactor, in particular a fast-flux nuclear reactor with a heat transfer gas at high temperature.

The description which follows is made by considering a reactor with a heat transfer gas, therefore, the term of <<aeraulic>> is used for describing the flow properties of the invention and the elements of the invention exposed to gas flow, notably the channels delimited by the plates are designated as aeraulic channels.

However, the present invention also applies to reactors cooled by a hydraulic fluid, for example cooled with sodium, which will not be described in detail. In these cases, the appropriate term would be <<hydraulic>> for notably describing the channels.

As a reminder, a nuclear fuel assembly notably includes an external casing forming the external walls of the assembly and an internal structure supporting the nuclear fuel plates, also called a fissile bundle.

According to the present invention, the fissile bundle is formed by a superposition of several supporting devices 2 loaded with nuclear fuel plates 4 illustrated in FIG. 3. The nuclear fuel plates will be designated subsequently in the description by plates 4.

The supporting device 2 or basket has a general hexagonal shape with a longitudinal axis X, including a bottom 6 with a shape of a regular hexagon forming a lower end of the basket and a lid 8 with a shape of a regular hexagon forming an upper end of the basket. The bottom 6 and the lid 8 are connected by external tie rods 10 parallel to the axis X and extending between a top of the lid 8 and a top of the bottom 6.

The tie rods are advantageously regularly distributed at the periphery of the bottom and of the lid in order to achieve a balanced connection between the bottom and the lid. In the illustrated example, the external tie rods 10 are three in number, the tie rods are distributed so as to ensure balanced distribution of the forces with limited congestion.

The tie rods are formed with rods having strong slenderness ratio.

The slenderness ratio is defined in the present application by the ratio of the length of the part over the thickness of the section.

We shall define the directions used subsequently in the description by means of FIG. 2.

The radial direction R of a plate is defined by the width of the plate; and the transverse direction T is defined by the thickness of the plate and orthogonal to the axial and radial directions.

The basket also includes a central beam 12 connecting the center of the bottom 6 to the center of the bottom 8. This beam 12 is hollow and is crossed by a central tie rod 14 which will be described subsequently. For this, the bottom 6 and the lid 8 include a central aperture 15 for letting through this central tie rod 14.

For example, the central beam 12 is fitted into hexagonal projections made in the central portions of the bottom 6 and of the lid 8.

This beam 12 stiffens the basket in the axial direction, allowing it to support the upper baskets, and sets the distance between the lid and the bottom, avoiding application of stresses along the X axis to the plates 4.

Further, with it, it is possible to guarantee the geometrical tolerances of the basket, notably the coaxiality of the bottom and of the lid, their parallelism, and their relative angular positioning.

With this beam, it is also possible to suppress the central dead space which consumes heat transfer fluid which is not involved in cooling the plates.

The bottom 6 and the lid 8 respectively include means 16, 18 for holding the plates 4.

The plates are defined by their length extending along the axial direction, their width extending along the radial direction, and their thickness extending along the transverse direction.

The plates are hexahedra, advantageously rectangular parallelepipeds.

The faces of larger surfaces may have different shapes. The latter may be parallelograms, for example substantially rectangles, trapeziums either isosceles or not, rectangular trapeziums.

The other faces of the plates may also have these shapes.

Generally, the angles of the parallelepiped are advantageously close to 90° and only deviate from this value by at most a few degrees, for example the angles are comprised between [85°, 105°].

The distance separating the bottom 6 and the lid 8, more particularly between the means 16 and 18 supporting a same plate, is larger than the length of a plate, this distance being selected so as to ensure axial plays allowing free deformation of the plates without any risk of dislodgement. A numerical example will be given in the subsequent description.

According to the invention, these means 16, 18 only support the plates along the radial direction and allow a small displacement along the transverse direction, the play is of the order of one tenth of a millimeter.

The plates positioned in the basket are distributed into three groups G1, G2, G3, wherein the plate 4 are all parallel to each other, the plates of two groups forming between them an angle of 60° C. We shall describe in particular the group of plates G1, but the description also applies to the other groups G2 and G3.

The means 16 for supporting the bottom are identical with those 18 for the lid, therefore we will describe in detail the means 16.

Each plate 4 is supported by means 16 independent of the means for supporting the other plates, the latter being all identical, we will describe the means 16 for supporting a single plate in detail.

The supporting means 16, visible in FIG. 5, include a comb provided with teeth 22 intended to penetrate into recesses 24 formed in an axial end 4.1 of a plate 4. The teeth 22 have a general triangular profile and have a given width $e_d$. The recesses 24 are defined by a bottom 24.1, the profile of which is complementary to that of the teeth and of the sidewalls 24.2, the distance separating the internal faces of the walls 24.2 being larger than the thickness $e_d$. The height of the teeth 22 is smaller than the depth of the recesses 24 as this may be seen in FIG. 6.

In the illustrated example, the comb includes five teeth, but provision may be made for two or three teeth or more than four teeth, depending on the width of the plates.

The comb also includes means intended to immobilize the plate 4 along the direction of the comb.

These means are formed by two tabs 26 interdependently attached to a tooth 22' and intended to bear upon one of the sides of the bottom 24.1 of the recess 24. Elastic deformation of these tabs causes flattening on the other side of the bottom of the tooth, immobilizing the plate 4 along the radial direction. The elastic stiffness of the projection formed by the tabs then maintains the plate 4 against the reference face of the tooth.

Advantageously, the tooth 22' is the innermost tooth of the comb, with which the thickness of the gas gap flowing along the face of the plate of the other group, located opposite the plate end 4 maintained by the tooth 22' may be guaranteed.

The other teeth as described earlier ensure transverse support of the plate, i.e. along the direction of the thickness. For this, transverse functional mechanical play is provided between the recesses 24 and the teeth 22 in order to guarantee free deformation of the plates along their thickness without affecting the fuel volume fraction in the core. The transverse degree of freedom brought by this play is neither capable of notably altering the cooling property of the plates, since this transverse play is of the order of a tenth of a millimetre for a distance between plates of 4 mm.

It may noted that provision might be made in another embodiment for producing a larger transverse play for the two central teeth, by which a larger degree of freedom may advantageously be obtained for possible bowing of the plates in the direction of the width, while guaranteeing transverse support of the plates in the case of a degradation of one of the two main connections. Indeed, in the case of bowing of the plates around the axial direction, the displacement of the plate (in the transverse direction) will be maximum at both central teeth; by increasing the transverse play at both of these teeth relatively to the two external teeth, the bowing capability is increased while guaranteeing a transverse positioning reference. Further, if one of the two external teeth is degraded, the transverse support of the plate is ensured by means of the central teeth.

Advantageously, by supporting the plate in the direction of the comb by a single tooth, it is possible to have only a single reference face, at the tooth provided with elastic tabs, this reference face being opposite to the one provided with tabs. This allows the positioning of the plate to be guaranteed with a tolerance as tight as possible.

The combs therefore ensure the support and the positioning reference of the plates without applying to them interaction stresses.

In the case when the comb is made in a metal material, the latter is produced, for example by folding or embossing a metal sheet strip and the tabs 26 are obtained by cutting out the strip at a tooth and by deforming the tabs in order to have a convex curvature.

Provision may be made for only making a single tab with sufficient stiffness in order to exert a force capable of radially maintaining the plate.

In the case when the combs are made in metal materials, the combs 16, 18 are then welded, for example with a laser or crimped on the bottom and the lid.

Each plate 4 is therefore maintained between an upper comb attached to the lid 8 and a lower comb attached to the bottom 6.

The external tie rods 10 guarantee proper support of the fuel plates in the teeth of the combs, since they avoid having too large misalignment between the bottom 6 and the lid 8 assembled in the basket. The bottom 6 and the lid 8 are in fact fine parts which may have flatness defects notably after manufacturing, and may be subject to significant deformations under the loading of the plates. Further, the tie rods allow the basket to be handled while ensuring the connection between the bottom and the lid.

The basket according to the present invention therefore forms a flexible structure of the cage type allowing individual support of the plates 4 axially through the bottom 6 and the lid 8 connected by external tie rods 10. The plates 4 are then supported without interaction stresses being applied to them. Indeed, with this support, free axial deformation and free radial bowing are possible. By means of the invention, mechanical decoupling of the plates 4 with each other and with the basket is therefore obtained.

Moreover, the basket according to the invention forms a means for easily loading the plates in order to form the fissile bundle.

Moreover, the plates may be handled in their supporting basket for several steps of the fuel cycle: transport, mounting in the fissile bundle and dismantling of the fissile bundle, reprocessing.

The baskets according to the invention loaded with plates are intended to be stacked.

Each basket in the illustrated example includes three small plates 28 each attached to a summit of the lid, one of which is visible in FIG. 7. The three summitss are separated by an angle of 120°, they protrude axially upwards. These small plates are folded so as to be flattened against both sides of the hexagon defined by the lid. The protrusions of the small plates therefore extend the hexagon formed by the lid.

In the illustrated example, the small plates 28 are advantageously attached to the external tie rods 10. The tie rods then form an abutment for the small plates under the condition of relative flexure of the supporting devices. Indeed, if the small plates were positioned at the three summitss without any tie rods, the fuel plates would be those which would form the abutment, which would be damageable for the mechanical integrity of the plates. Moreover, attachment at the tie rods is facilitated, the latter forming an attachment surface.

These small plates ensure relative positioning of the baskets relatively to each other. This maintaining of relative positioning ensures continuity of the channels defined between the plates through which flows the heat transfer gas, while allowing them to flex the baskets relatively to each other so as to be able to accommodate the bowing of the casing.

Further, these small plates 28 form spacers interposed between the basket and the inner face of the casing, the latter prevent direct contacts between the plates and the casing, and set an aeraulic layer thickness between the external plates and the casing.

The baskets ensure distribution of the functional mechanical plays around the plates allowing mechanical decoupling of the fuel plates of the structures of the core.

We shall now describe the making of a fissile bundle according to the invention.

The latter is formed by a stack of baskets 2 according to the invention, the baskets being loaded with plates 4.

The fissile bundle includes a base 30 with a matching hexagonal shape, this base includes a hexagonal frame 30.1 and cross-beams 30.2 outlining the three locations of the groups of plates. The base 30 also includes small plates 32 similar to the small plates 28 of the baskets 2, these small plates like those for the baskets, are able to ensure proper positioning of the first basket 2 on the base 30.

The base 30 also includes a central tie rod 14 attached to the point of convergence of the three cross-beams 30.2 and extending axially, the latter is intended to pass through the baskets as this will be seen subsequently.

The first basket of the stack forms the base of the stack, the latter is deposited on the base, the central tie rod 14 passing through the central beam 12.

The next basket is then positioned between the small plates 28, the central beams 12 of both baskets are then aligned, allowing the passage of the central tie rod 14. The plates are also aligned axially per group, thereby forming continuous channels between the plates over two heights of baskets.

The third basket loaded with plates is then stacked on the second basket as previously, and so forth until the required number of plates 4 is reached.

The stack then includes a central passage defined by the alignment of the hollow beams and crossed by the central tie rod and continuous channels between the plates.

The central tie rod 14 includes an upper abutment 31 which is particularly visible in FIG. 10. This abutment 31 is intended to avoid delocalization of the baskets during operation, but also during any fuel handling step. Moreover, it allows facilitated handling of the fissile bundle for mounting it in the hexagonal casing. In FIG. 8, the casing 34 is partly placed on the stack of the baskets.

The base 30 also allows attachment of the fissile bundle in the hexagonal casing.

We shall now describe an exemplary nuclear fuel plate 4 particularly adapted to the present invention, described in document FR 2 889 765.

The plate 4 illustrated in FIGS. 4A-4C includes a structure comprising a composite element as a plate with a macrostructure defining individual cells for each pellet. The macrostructure composite plate element 4 is built on the basis of a sandwich panel with two cladding panels 102, 104, the core of which is a grid 106 of cells 108 ordered as a honeycomb, positioned substantially orthogonal to the faces of the plates 102, 104.

Each cell 108, delimited by the wall 106 and closed at its end by the faces 102, 104 of the plate element 4, forms an elementary cell in order to ensure heat transfer between the fuel 110 which will be localized therein and the faces of the cladding panels 102, 104 cooled by the heat transfer gas, for arranging the expansion volume of the fission gases, and for promoting a fuel 110/cladding 102, 104 mechanical interaction with low stress in the structures of the cell.

These plates provide a small slenderness ratio and significant flexural stiffness, which allows limitation of the bowings to a few tenths of millimeter. This small bowing therefore avoids significant modification of the thickness of the channels for circulation of heat transfer fluids delimited by the faces of the plates.

Preferably, the whole of the structure of the element 4, i.e. the grid 106 and each of the cladding panels 102, 104 is made in the same refractory material, which may be a metal, or a ceramic, the ceramic may be monolithic or include fibers which are themselves ceramics.

As an example, the plates may have the following dimensions in mm:

257.3×128.9×8.4.

The plates described in document FR 2 889 765 were modified in order to be particularly adapted for support in the device according to the invention. In particular, the recesses 24 receiving the teeth 22 are formed by hexagonal half-cells, the cells receiving one pellet. These half-cells form a trapezium, the larger base of which coincides with the lower or upper axial edge of the plate.

Further, the side edges of the plate are solid and form a substantially smooth surface relatively to those of the plates of document FR 2 889 765. With this smooth structure of the side edges, it is possible:
- to fill the dead space formed by the triangular sub-channels located on the edge of plates,
- to limit heterogeneity of the temperature profiles of the neighboring plates,
- to avoid singular pressure losses caused by the profile of incomplete cells at the edge of the plate.

Further, provision is also made for suppressing the row of internal cells for the three central plates in order to clear the space required for letting through the central tie rod. It should be noted that this suppression only reduces the fuel volume fraction by about 0.3%.

It is also well understood that the present invention is not limited to the assembly of plates such as those described above but any other type of plate may be suitable, for example a plate wherein the nuclear fuel is no longer found as a pellet, but as a dispersion of particles in a matrix, or a plate in which the fuel provides a lamellar arrangement.

The fissile bundle is then inserted into a casing 34 formed by a tube with a hexagonal section, the insertion of the bundle into the casing being guided by the small plates 28 and 32.

According to the invention, the fissile bundle is formed by a stack of baskets, more particularly a stack of plates, there is therefore axial segmentation of the fissile bundle into compact group units of plates. With this segmentation, it is possible to accommodate the casing bowings by flexure of the baskets 2 relatively to each other. Moreover, the casing 34 is in contact with the fissile bundle only at the small plates. It should be noted that the fissile bundle does not contribute to the mechanical stiffness of the casing, insofar that the relative flexure of the supporting devices allows accommodation of the bowing of the casing.

Further, with this segmentation it is possible to distribute the bowings at the scale of each plate, therefore to have small local bowings instead of a large global bowing which would be unacceptable notably as regards criteria of thermics. Indeed, in the case of significant shrinkage of an aeraulic channel, it would not be possible to obtain proper cooling of a plate. And in the opposite case, in the case of significant widening of an aeraulic channel, a dead volume of heat transfer fluid may be created, for which part of the gas would not be used.

Moreover, this axial segmentation makes assembling and disassembling of the fissile bundle easier, as well as the making of the fuel elements and of the supporting structures.

The basket has a substantial intrinsic flexibility, i.e. without considering the strong global stiffening of the whole of the basket when the plates are loaded. This stiffening is due to the intrinsic stiffness of the plates, since they have a small slenderness ratio, and of their loading into three bundles tilted by 60° relatively to each other. With this intrinsic flexibility, it is possible to avoid application of significant interaction stresses to the fuel plates in the case of larger differential deformations than the expected ones. This flexibility is related to the cage type structure, which is very thin and well ventilated. The flexibility is more particularly obtained by flexure and torsion for the whole of the basket, when it is not loaded with plates, relatively to the axis of the bundle, insofar that the central beam forming the only partitioned axisymmetrical axial element, is close to the neutral fiber. As to the external tie rods, as they are located at the periphery, they do not provide great stiffness in flexure and especially in torsion because of their very large slenderness ratio.

This flexibility is particularly obtained in flexure for the bottom and the lid because of their small thickness.

By means of the present invention, it is possible to reduce the aeraulic dead spaces, notably those which may appear between the internal face of the casing and the plates. Indeed, the present invention provides axial support, which allows the plates 4 to be positioned as close as possible to the outer limit of the supporting structure; in this case, the edges and the faces of the plates are located in the same plane as the faces of the external tie rods 10, the latter delimiting the external envelope of the baskets. Therefore, there is only a very small peripheral aeraulic dead space and the loss of fuel volume fraction is also reduced significantly as compared with a transverse support of the lateral rail type of the state of the art. Indeed, it is seen that the volume formed by a connection at the external periphery of the bundle and its functional mechanical plays is much larger than that for a connection positioned at the axial ends of the plates.

Moreover the present invention applies a limited number of connections, by which isostatic positioning of the plates may be guaranteed.

With the axial plays, plates may be freely deformed without any risk of dislodgement, a play of 1.7 mm for example being provided for a supporting depth of 4.3 mm. The supporting depth of 4.7 mm corresponds to the penetration distance of the teeth into the recesses 24 and the play of 1.7 mm is the play between the top of a tooth and the bottom of the recess 24.

Further, the positioning along the radial direction, i.e. along the direction of the width of the plates, is only ensured according to the present invention by a single tooth, this positioning further being elastic.

Moreover, the present invention gives the possibility of not having to resort to spacers between the adjacent plates in order to avoid a too large variation of the aperture of the aeraulic channels because of the bowing of the fuel plates. Indeed, segmentation of the bundle by superposing several storeys of plates over the height of the fissile bundle allows strong limitation of the slenderness ratio of the plates and therefore small local bowings may be obtained of the order of a few tenths of a millimeter at the scale of each plate, which does not have notably any consequence from a thermo-aeraulic point of view.

On the contrary, in the case of plates extending over the whole height of the bundle, the global bowing would be unacceptable, since it would prevent proper cooling of a plate in the case of significant closure of an aeraulic channel, and would cause the occurrence of dead spaces in the case of a significant opening of an aeraulic channel.

The plates described in connection with the present invention are particularly adapted to segmentation of the bundle because of their low slenderness ratio.

Moreover, according to the invention, there is a dissociation between the structures ensuring the support of the fuel elements, i.e. the baskets and the structures ensuring the mechanical architecture of the core.

Indeed, the only contacts between the casing and the fissile bundle occur at the base of the fissile bundle ensuring the support of the baskets and at the small plates 28 positioned at the junction between the baskets and forming spaces. These small plates form preferential contact points of the fissile bundle with the hexagonal casing, instead of having direct contact between the plates and the casing, since the edge of the plates is located in the same peripheral plane than the external tie rods of the baskets, i.e. set back from the outer faces of the small plates.

A transverse play is defined between the casing and the small plates located at the outer periphery of each basket. This transverse play allows differential deformations to be accommodated during the whole irradiation as well as during the mounting of the fissile bundle in the casing. This transverse play is further limited because of the axial segmentation of the fissile bundle. This segmentation, as we have explained earlier, notably allows a reduction in the required transverse play for mechanically decoupling the fissile bundle of the casing.

Generally, it was noticed that in the case of a fast neutron reactor, the hexagonal tubes of a fast reactor may have maximum bowing off the grid of the order of 1% in the area of maximum differential swelling located between the maximum flux plane and the height of the bundle, which corresponds to a deflection of about 10 mm per meter. Having maximum bowing off the grid of GFR assembly casings of the order of 12 mm over a half-height of the fissile bundle may be expected by assuming a height of the fissile bundle of 2,349 mm. The maximum flux plane corresponds to the axial section of the core where the neutron flux is maximum, i.e. it corresponds approximately to the middle core plane; the bowing off the grid is the bowing which the assembly has when it is removed from the core, therefore when it is no longer subject to grid stresses from the neighboring assemblies.

In the fissile bundle of the present invention, there occurs relative flexure of the baskets relatively to each other which allow accommodation of the bowing of the casing as illustrated in FIG. 9. Moreover, a functional mechanical play between each basket and the casing is provided so as to be able to accommodate the bowing of the casing at the scale of a basket: this diametrical play is then of the order of 2.5 mm insofar that a basket measures 250 mm in height.

As a comparison, if the fissile bundle only consisted of a single basket of plates, in other words if the basket of plates occupies the whole height of the fissile bundle, i.e. 2,349 mm, the diametrical functional play of at least 12 mm would therefore have to be guaranteed between the fissile bundle and the casing in order to be able to accommodate bowing of the casing. Indeed, it is desirable that the mechanical decoupling be guaranteed not only during operation in the unit, but also during the phases for handling the assembly out of the unit. Such a play is unacceptable, both from the neutron point of view, since there will be a decrease in the volume fraction of fuel, and from the thermoaeraulic point of view, since there would be an occurrence of dead spaces between the plates and the casing.

The height of the axial protrusion of the small plates 28 and the diametrical play defined between the internal distance across flats of the small plates and the base of the upper basket defining the relative flexural capacity between two baskets. For example, if a minimum diametrical play of two tenths of a millimeter is considered during operation, which play corresponds to an initial functional mark of five tenths reduced by three tenths when placed under the most adverse conditions in terms of manufacturing tolerances and of differential deformation between baskets, and to an axial protrusion of 12 mm, the total possible flexure of the stack of nine baskets has a value of about 15 mm, which actually allows accommodation of the 12 millimeters of maximum bowing of the casing.

For example, a diametrical play of five tenths allows an angular shift between two baskets expressed by maximum covering of the aeraulic channels of the order of two to three tenths of a millimeter at the bundle periphery. This covering does not generate any redhibitory pressure drop at the scale of the bundle.

An axial play is provided between the stack of baskets and the upper abutment of the central tie rod of the fissile bundle, with this axial play it is possible to accommodate differential deformations between the stack of baskets and the tie rod, but it also allows maximum flexure of the fissile bundle, this axial play is of about 10 mm. Provision is then made for having the axial protrusion of the small plates relatively to the lid of the basket advantageously larger than this axial play, avoiding any possibility of dislodgment of the baskets within the fissile bundle.

As we have explained this earlier, the radial protrusion formed by the small plates relatively to the external tie rods of the basket makes it possible to ensure the thickness of the peripheral aeraulic channel required for cooling the external faces of the plates located at the periphery of the fissile bundle.

Also advantageously, a large radial play is provided between the central tie rod of the fissile bundle and the bore made in the central beams of the baskets. With this play, it is possible to maximally delay the contact of the tie rod with the baskets when they are in a flexural condition, so that the tie rod does not impart any flexural stiffness to the fissile bundle, confirming the mechanical decoupling of the fissile bundle and of the casing.

It should however be noted that, if such a contact occurred, the contribution which it would then bring to the flexural stiffness of the fissile bundle would be small, because of its large slenderness ratio and of its position on the neutral fiber of the fissile bundle. As this has already been described, with the central beam, it is possible to prevent the space cleared within the basket for ensuring the passage of the central tie rod from forming a significant dead space for the heat transfer fluid.

Codes such as FLUENT, Star-CD and Trio_U have been used for achieving dimensioning of the aeraulic channels ensuring the cooling of the plates and for making sure that the radial functional mechanical plays globally produced between the fuel plates and the hexagonal casing, in order to ensure mechanical decoupling of the plates and of the structures of the core, did not lead to redhibitory dead spaces as well as to unacceptable over-cooling of the ends of the fuel plates. Indeed, a strong non-linear heat gradient in the width of the fuel plates may lead to their being damaged. With the code CATHARE, it was moreover possible to make sure that the pressure losses generated within the fissile bundle were compatible with the capacity of evacuating the residual power during accidental transients.

From a neutron point of view, with the code ERANOS it was possible to make sure that the main criteria for proper neutron operation of the core are observed, notably the regeneration gain, the reactivity coefficients in a rated and accidental (doppler and helium depressurization, material inventory, . . . ) situation.

The supporting device according to the invention has the advantage of ensuring a good capacity for feeding the aeraulic channels with heat transfer fluid in all the operating conditions. Indeed, the structure of the baskets is such that it does not partition the aeraulic channels within the casing but on the contrary allows systematic opening of these channels, because of the extremely <<ventilated>> structure of the baskets and of all the radial and axial plays produced between the fuel plates and the structures. With this, it is possible to ensure cooling of the fuel plates for any operating situation. Indeed, in the case of accidental blocking of an aeraulic channel, with this departitioning it will be possible to again ensure supply of the blocked channel with heat transfer fluid by recirculation distances provided between the different channels.

Moreover, a fuel volume fraction in the core equal to 23% may be obtained by means of the invention, let us recall that a high volume fraction of fuel, at least of the order of 20% is required. This is possible by means of the reduced volumes of the structures of the assembly, of the limited congestion of the actual means applied for holding the fuel elements, by optimizing the distribution of the functional mechanical plays in the whole fissile bundle.

As an example, the distribution of the following volume fractions among the different core components, may be given:
  1.2% for the volume between two assemblies,
  30% for the aeraulic channels (required for direct cooling of the plates and the minimum thickness of which is also strongly constrained by the core pressure loss),
  37.3% for the fuel plates (without taking the fuel into account, i.e.: the whole cladding, expansion vessels and incomplete half-cells),
  8.5% for the structures of the core, the size of the supporting systems and the functional mechanical plays; these 8.5% are distributed in the following way: 3.5% of structure (including 1.0% for the baskets and the tie rod of the fissile bundle and 2.5% for the hexagonal casing), 1% of axial plays at the basket head, and 4.0% for the size of the supporting systems and the mechanical plays (plays essentially formed by the radial distance between the plates and the internal walls of the hexagonal casing).

It will be noted that the minimization of the structure volume fraction moreover meets another neutron criterion which is of making the structures as <<transparent>> as possible to neutrons so as not to perturb neutron operation of the core.

Moreover, with the present invention it is possible to produce compact units of fuel elements in order to facilitate the operations of all the steps of the fuel cycle.

They are preferential units for conditioning the fuel plates and they may allow optimization of the size and dimensioning of the numerous systems of the fuel cycle, for example the handling arms, the airlocks and handling corridors, the shielded cells for assembling fuel elements, the cells for transport, storage and reprocessing, .... The size of all these systems may then be reduced because of the compactness of the units for conditioning the plates.

Moreover, mounting of the fissile bundle is facilitated, as well as the making of fuel elements and of supporting structures.

Moreover, the possibility of dismantling the structures allows their lifetime to be optimized, the amount of activated waste to be thereby minimized, which allows improvement in reprocessing. By dissociation of the fissile bundle and of the hexagonal casing, by segmentation of the fissile bundle into several distinct units and finally by the absence of any attachment of the fuel elements to their supporting structure, it is possible to maximally promote the possibility of dismantling the structures of the fissile portion of the core.

Moreover it will be noted that the segmentation of the fissile bundle into distinct units which may be disassembled, gives the possibility of optimizing the management of fuel in the core, by modifying the distribution of the units in the fissile bundle at each new cycle.

We shall now give an exemplary embodiment of the fissile bundle and of the corresponding core according to the invention.

The fissile core has a height of 2,349 mm and a diameter of 3,789 mm.

The hexagonal casing has an internal distance between flats of 223 mm.

The baskets which form the structures bearing groups of fuel plates are about 257 mm height for 220.5 mm wide, for a mass of about 47 kg when they are loaded with 27 plates.

The structures of the basket have relatively small thicknesses of a few millimeters.

Provision is therefore made for nine baskets per fissile bundle and 27 plates per basket During normal operation, this fissile bundle has an average thermal power of 9.8 MW (the complete core comprising 246 fissile assemblies having a total power of 2,400 thermal MW).

Helium is used as heat transfer gas.

The temperature of the heat transfer fluid at inlet of the assemblies (and therefore approximately at the inlet of the fissile bundle) is set to about 400° C. The average temperature of the heat transfer fluid at the outlet of the assemblies (and therefore substantially at the outlet of the fissile bundle) is then about 900° C.

The maximum temperature of the envelope of the nuclear fuel plates is about 985° C.

The maximum fuel temperature is about 1,375° C.

A core pressure loss of 1.34 bar, including 1.10 bar in the fissile bundle, is measured.

The materials used may be:
  for the fuel, (U,Pu)C,
  for the structure of the fuel plate (cladding of the fuel), silicon carbide reinforced with fibers of silicon carbides,
  for the structures of the fissile bundle exposed to high temperatures not allowing the use of metal materials conventionally used in fast neutron reactors, the baskets and the tie rods are for example made in silicon carbide reinforced with fibers of silicon carbides in the case of the bundle as defined above or else in refractory metal alloy.

For a refractory metal alloy, we shall now describe an exemplary method for making structures of the fissile bundle illustrating the simplification of the making a fissile bundle by means of the present invention.

The method for making a basket according to the present invention includes the steps:
  making the bottom and the lid of the baskets by bulk-machining,
  making combs by folding and/or embossing,
  making the central sleeve by drawing,
  making the external tie rods by machining,
  attaching the combs on the bottom and on the lid by crimping, welding or brazing,
  attaching the small plates on the external tie rods by welding or brazing, or machining the small plates in the bulk of the tie rods,
  attaching the tie rods on the bottom and on the lid by welding or brazing, possibly reinforced by an additional mechanical connection ensured by fitting a centering pin therein,
  attaching the central sleeve onto the base and the lid by fitting it therein, welding or brazing,
  mounting the plates by means of dedicated devices,
  attaching the lid on the tie rods, by welding and brazing, optionally reinforced by an additional mechanical connection ensured by fitting a centering pin therein.

The present invention mainly applies to high temperature fast reactors with heat transfer gases, but it is understood that it may be applied to reactors for which the operating conditions are less difficult.

For example, it applies to reactors using heat transfer fluids having better conductive exchange capacities than the gas, for example sodium, and operating at lower heat transfer fluid temperatures. Further, the present invention applies to the support of any type of plate as this has been already mentioned, for example to plates such as those described in document FR 2 889 765 or to plates in which the nuclear fuel is dispersed in a matrix.

The invention claimed is:

1. A device for supporting nuclear fuel plates with a longitudinal axis including:
   a bottom forming a lower longitudinal end of the supporting device, and
   a lid forming an upper longitudinal end of the supporting device,
   a central connector and peripheral connectors connecting the bottom and the lid to each other,
   a plurality of upper means for supporting the plates attached to the lid, each upper supporting means having at least one tooth configured to elastically support an upper longitudinal end of a plate in the direction of the width of the plate and configured to enable free deformation of the upper longitudinal end of the plate in the direction of the thickness of plate,
   a plurality of lower means for supporting the plates attached to the bottom, and each lower supporting means having at least one tooth configured to elastically support an upper longitudinal end of a plate in the direction of the width of the plate and configured to enable movement of the lower longitudinal end of the plate in the direction of the thickness of the plate.

2. The supporting device according to claim 1, wherein each upper supporting means includes an upper comb provided with a plurality of aligned teeth, protruding longitudinally towards the bottom, one of said teeth being configured to exert an elastic force along the direction of the width of the plate and each lower supporting means includes a lower comb provided with a plurality of aligned teeth, protruding longitudinally towards the lid, one of said teeth being configured to exert an elastic force along the direction of the width of the plate.

3. The supporting device according to claim 2, wherein the teeth capable of exerting an elastic force along the direction of the width of the plate are positioned at an axial end of the lower and upper combs positioned towards a central portion of the bottom and of the lid respectively.

4. The supporting device according to claim 2, wherein the teeth capable of exerting an elastic force along the direction of the width of the plate include at least one elastically deformable curved tab of a single piece with the tooth.

5. The supporting device according to a claim 1, having a cross-section having the shape of a regular hexagon, the upper and lower supporting means being distributed in three rhombus-shaped areas, a rhombus of the bottom facing a rhombus of the lid.

6. The supporting device according to claim 5, wherein the lower combs of a same area are positioned parallel to two sides of the rhombus and are separated by a given distance, and all the upper combs of a same area are positioned parallel to two sides and are separated by said given distance.

7. The supporting device according to claim 1, including three longitudinal tie rods attached on the periphery of the bottom and of the lid, connecting the bottom and the lid 8. The supporting device according to claim 1, including a central beam interposed between the bottom and the lid, said beam including a longitudinal through-passage.

9. The supporting device according to claim 1, including a device for orienting an upper supporting device, a bottom of which is intended to rest on the lid so as to align the plates positioned in the supporting device with those positioned in the upper supporting device.

10. The supporting device according to claim 9, wherein this orientation device includes small plates attached on a periphery of the lid and protruding longitudinally away from the bottom, so as to delimit a perimeter with a hexagonal shape.

11. The supporting device according to claim 10 including three longitudinal tie rods attached on the periphery of the bottom and of the lid, connecting the bottom and the lid, and wherein the small plates are attached onto the longitudinal tie rods.

12. The supporting device according to claim 2, wherein the teeth capable of exerting an elastic force along the direction of the width of the plate comprise at least one elastically deformable tab fixed to the tooth.

13. The supporting device according to claim 12, wherein the at least one elastically deformable tab is curved.

14. The supporting device according to claim 12, wherein the at least one elastically deformable tab is of a single piece with the tooth.

* * * * *